(12) United States Patent
Furuya

(10) Patent No.: US 8,257,176 B2
(45) Date of Patent: Sep. 4, 2012

(54) GAME DEVICE AND METHOD FOR PROCESSING IMAGES RESPONSIVE TO CAPTURED PLAYER IMAGES

(75) Inventor: Manabu Furuya, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 10/178,515

(22) Filed: Jun. 25, 2002

(65) Prior Publication Data

US 2003/0003992 A1   Jan. 2, 2003

(30) Foreign Application Priority Data

Jun. 29, 2001 (JP) ................................. 2001-199003

(51) Int. Cl.
*A63F 9/24* (2006.01)

(52) U.S. Cl. .......................................... 463/36; 382/276

(58) Field of Classification Search .................... 463/36, 463/35; 382/276
See application file for complete search history.

(56) References Cited

U.S. PATENT DOCUMENTS

| | | | | |
|---|---|---|---|---|
| 5,241,608 | A | * | 8/1993 | Fogel ............................. 382/107 |
| 5,414,256 | A | | 5/1995 | Gurner et al. |
| 5,483,261 | A | | 1/1996 | Yasutake |
| 5,649,861 | A | | 7/1997 | Okano et al. |
| 5,704,836 | A | * | 1/1998 | Norton et al. ................... 463/36 |
| 6,009,210 | A | * | 12/1999 | Kang ............................. 382/276 |
| 6,176,782 | B1 | * | 1/2001 | Lyons et al. ..................... 463/36 |
| 6,890,262 | B2 | * | 5/2005 | Oishi et al. ...................... 463/31 |
| 7,452,275 | B2 | * | 11/2008 | Kuraishi ........................ 463/30 |

FOREIGN PATENT DOCUMENTS

| JP | 10-154238 A | 6/1998 |
|---|---|---|
| KR | 2001-27533 A | 4/2001 |

* cited by examiner

*Primary Examiner* — Corbett B Coburn
(74) *Attorney, Agent, or Firm* — Sughrue Mion, PLLC

(57) ABSTRACT

Proper recognition of a position can be achieved even when a predetermined part of a player moves rapidly. An image of a player is captured by a camera unit, and from this image the head position of the player is recognized, so that the game proceeds based on the recognized result. At this time, a base position group is selected in principle from a difference between the latest and immediately preceding player images within a selection range corresponding to the previously recognized position (S207), and the selection range is changed exceptionally to reselect the base position group from the difference (S210).

7 Claims, 18 Drawing Sheets

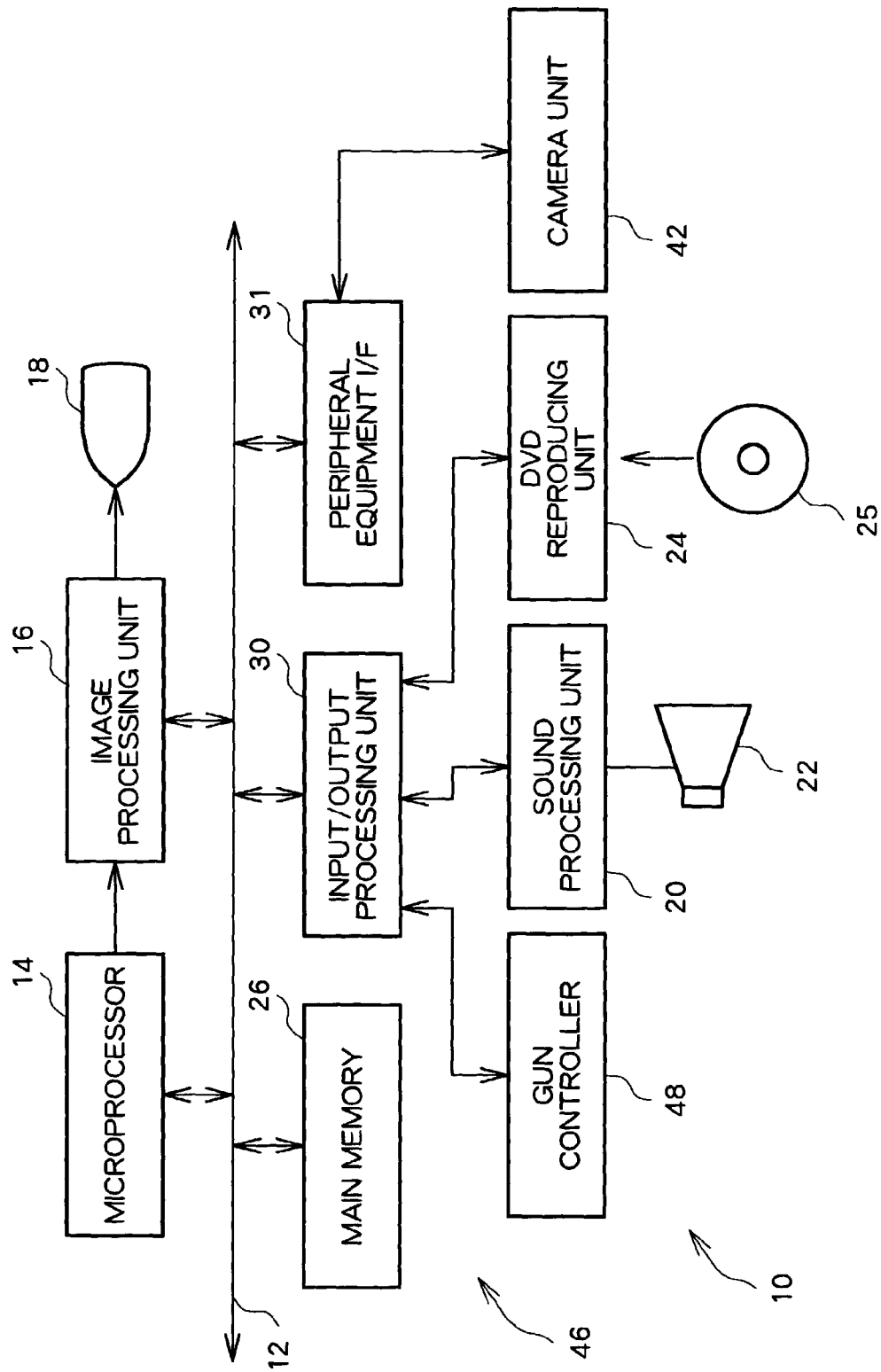

GAME DEVICE AND METHOD FOR PROCESSING IMAGES RESPONSIVE TO CAPTURED PLAYER IMAGES

BACKGROUND OF THE INVENTION

The present invention relates to a game device, and a method and program for processing an image of a person. The present invention more particularly relates to a technique for recognizing a position of a predetermined part from the image of the person, and a technique for filtering the recognized position.

Arcade game machines having a camera unit located in front of a player and proceeding with a game in accordance with a result of recognizing a position of a predetermined part, such as a hand, of the player from a player image captured by the camera unit are well-known. Such a game machine can provide players with a much wider variety of games than conventional game machines in which a controller is only operated with fingers.

However, the above game machines have the following disadvantage.

As the accuracy of recognizing the position of the predetermined part of the player is lowered by noise or moving objects (other than the player) accidentally caught in the player image, an approach of selecting the recognized position of interest from the vicinity of the previously recognized position is desirable when the position recognition is performed at predetermined time intervals. This approach, however, cannot achieve proper recognition of the position when the predetermined part of the player moves rapidly.

In addition, when the position of the predetermined part of the player is recognized and such a recognized position is used for a game process without any change, fluctuation in recognized position may be too intense to properly perform the game process. Therefore, an approach of applying a filter (a low pass filter) to the recognized position for conversion into an output suitable for the game process may seem desirable, but this approach degrades response of an output value to the movement of the predetermined part of the player. As a result, the game process cannot be rapidly changed to cope with the rapid movement of the predetermined part of the player, making the game less interesting.

SUMMARY OF THE INVENTION

The present invention has been conceived in view of the above-described problems, and a first object thereof is to provide a game device, and a method and program for processing an image of a person, capable of achieving proper recognition of a position even when a predetermined part of a player moves rapidly.

A second object of the present invention is to provide a game device, and a method and program for processing an image of a person, capable of rapidly changing a game process to cope with rapid movement of a predetermined part of a player.

In order to achieve the first object, a game device according to one aspect of the present invention comprises image capturing means for capturing player images at predetermined time intervals, selecting means for selecting a base position group used for recognizing a predetermined part of a player from a predetermined selection range corresponding to a previously recognized position based on the player images captured by said image capturing means, reselecting means for changing said selection range in accordance with the selected base position group to reselect the base position group used for recognizing the predetermined part of the player, and recognized position determining means for determining a present recognized position based on the base position group selected by said selecting means or reselected by said reselecting means.

According to the present invention, player images are captured at predetermined time intervals. Based on the player image, a base position group for a predetermined part, such as a hand or a foot, of a player is selected. The base position group is selected from a predetermined selection range corresponding to a previously recognized position. This predetermined selection range is subject to change based on the selected base position group. When the selection range is changed, the base position group is reselected from the changed selection range. The present recognized position is determined based on the selected base position group or reselected base position group.

According to the present invention, the base position group is selected from the selection range corresponding to the previously recognized position in principle, and is reselected exceptionally after changing the selection range on the occasion when, for example, the base position group within the selection range is small. It is therefore made possible that, while the present recognized position is determined as being in the vicinity of the previously recognized position in principle, the position is determined after changing the selection range to reselect the base position group especially when the predetermined part of the player moves rapidly (for example when the base position group is small in the vicinity of the previously recognized position). As a result, proper position recognition can be achieved even when the predetermined part of the player moves rapidly.

A method of processing an image of a person according to another aspect of the present invention comprises capturing images of a person at predetermined time intervals, selecting a base position group used for recognizing a predetermined part of the person from a predetermined selection range corresponding to a previously recognized position based on the captured images of the person, changing the selection range based on the selected base position group to reselect the base position group used for recognizing a predetermined part of the person, and determining a present recognized position based on the selected or reselected base position group.

A program according to a further aspect of the present invention causes a computer to execute capturing images of a person at predetermined time intervals, selecting a base position group used for recognizing a predetermined part of the person from a predetermined selection range corresponding to a previously recognized position based on the captured images of the person, changing the selection range based on the selected base position group to reselect the base position group used for recognizing a predetermined part of the person, and determining a present recognized position based on the selected or reselected base position group.

According to the present invention, images of a person, such as a player, is captured at predetermined time intervals. Based on the images of the person, a base position group of a predetermined part, such as a hand or a foot, of the person is selected. The base position group is selected from a predetermined selection range corresponding to a previously recognized position. The predetermined selection range is subject to change based on the selected base position group. When the selection range is changed, the base position group is reselected from the changed selection range. The present recognized position is determined based on the selected base position group or reselected base position group.

According to the present invention, it is possible to select the base position group from the selection range corresponding to the previously recognized position in principle, and to change the selection range for reselecting the base position group exceptionally when, for example, the base position group within the selection range is small. As a result, it can be achieved that, while the present recognized position is determined as being in the vicinity of the previously recognized position in principle, the position is determined after changing the selection range to reselect the base position group especially when the predetermined part of the person moves rapidly (for example when the base position group is small in the vicinity of the previously recognized position). Consequently, proper position recognition can be achieved even when the predetermined part of the player rapidly moves.

According to one embodiment of the present invention, the selecting means selects the base position group used for recognizing the predetermined part of the player from the predetermined selection range surrounding the previously recognized position, and the reselecting means shifts the selection range based on the player image. As a result, while the base position group is selected in the vicinity of the previously recognized position in principle, the selection range can be shifted in a direction where, for example, the base position group is increased based on the player image when, for example, the base position group is small.

In order to achieve the second object, a game device according to a further aspect of the present invention comprises image capturing means for capturing player images at predetermined time intervals, recognizing means for recognizing a position of a predetermined part of a player based on the player images captured by the image capturing means and outputting the recognized position, recognized position storing means for storing a predetermined number of recognized positions formerly output by the recognizing means, movement amount calculating means for calculating an amount of movement for each recognized position stored by the recognized position storing means, number changing means for changing the number based on the amount of movement for each recognized position calculated by the movement amount calculating means, output value calculating means for calculating an output value based on the number of recognized positions stored by the recognized position storing means, and game processing means for performing a game process based on the output value supplied by the output value calculating means.

According to the present invention, player images are captured at predetermined time intervals, and a position of a predetermined part, such as a hand or a head, of a player is recognized based on the player images. A predetermined number of former recognized positions are stored in recognized position storing means, and an amount of movement for each recognized position stored in the recognized position storing means is calculated. An amount of movement for a recognized position is, for example, the distance from an immediately preceding recognized position to that particular recognized position. Based on the thus calculated amount of movement for each recognized position, the stored number in the recognized position storing means is changed. An output value may be an average value or the like of the recognized positions stored in the recognized position storing means, and the game process is performed based on the output value.

According to the present invention, the number of former recognized positions affecting the output value can be changed based on the amount of movement of the recognized positions, whereby the game process can be rapidly changed even when the predetermined part of the player moves rapidly.

A method of processing images of a person according to a further aspect of the present invention comprises capturing the images of the person at predetermined time intervals, recognizing a position of a predetermined part of the person based on the captured images of the person and outputting the recognized position, sequentially storing the recognized position in storing means, calculating an amount of movement for each recognized position stored in the storing means, changing the number of recognized positions stored in the storing means based on the calculated amount of movement for each recognized position, and calculating an output value based on the recognized position stored in the storing means.

A program according to a further aspect of the present invention causes a computer to execute capturing images of a person at predetermined time intervals, recognizing a position of a predetermined part of the person based on the captured images of the person and outputting the recognized position, sequentially storing the recognized position in storing means, calculating an amount of movement for each recognized position stored in said storing means, changing the number of recognized positions stored in the storing means based on the calculated amount of movement for each recognized position, and calculating an output value based on the recognized position stored in said storing means.

According to the present invention, images of a person, such as a player, are captured at predetermined time intervals, and a position of a predetermined part, such as a hand or a head, of the person is recognized based on the images of the person. A predetermined number of former recognized positions are stored in recognized position storing means, and an amount of movement for each recognized position stored in the recognized position storing means is calculated. An amount of movement for a recognized position is, for example, the distance from an immediately preceding recognized position to that particular recognized position. Based on the thus calculated amount of movement for each recognized position, the stored number in the recognized position storing means is changed. An output value may be an average value or the like of the recognized positions stored by the recognized position storing means.

According to the present invention, the number of former recognized positions affecting the output value can be changed based on the amount of movement of the recognized position, so that the output value can be rapidly changed to cope with a situation where the predetermined part of the person moves rapidly.

BRIEF DESCRIPTION OF THE DRAWINGS

FIG. 5 is a diagram illustrating a hardware configuration of the game device.

DESCRIPTION OF THE PREFERRED EMBODIMENTS

The entire disclosure of the corresponding Japanese application 2001-199003 filed on Jun. 29, 2001 including specification, claims, drawings and summary, is incorporated herein by reference.

Exemplary embodiments of the present invention will now be described in detail with reference to the drawings.

Figure 1:
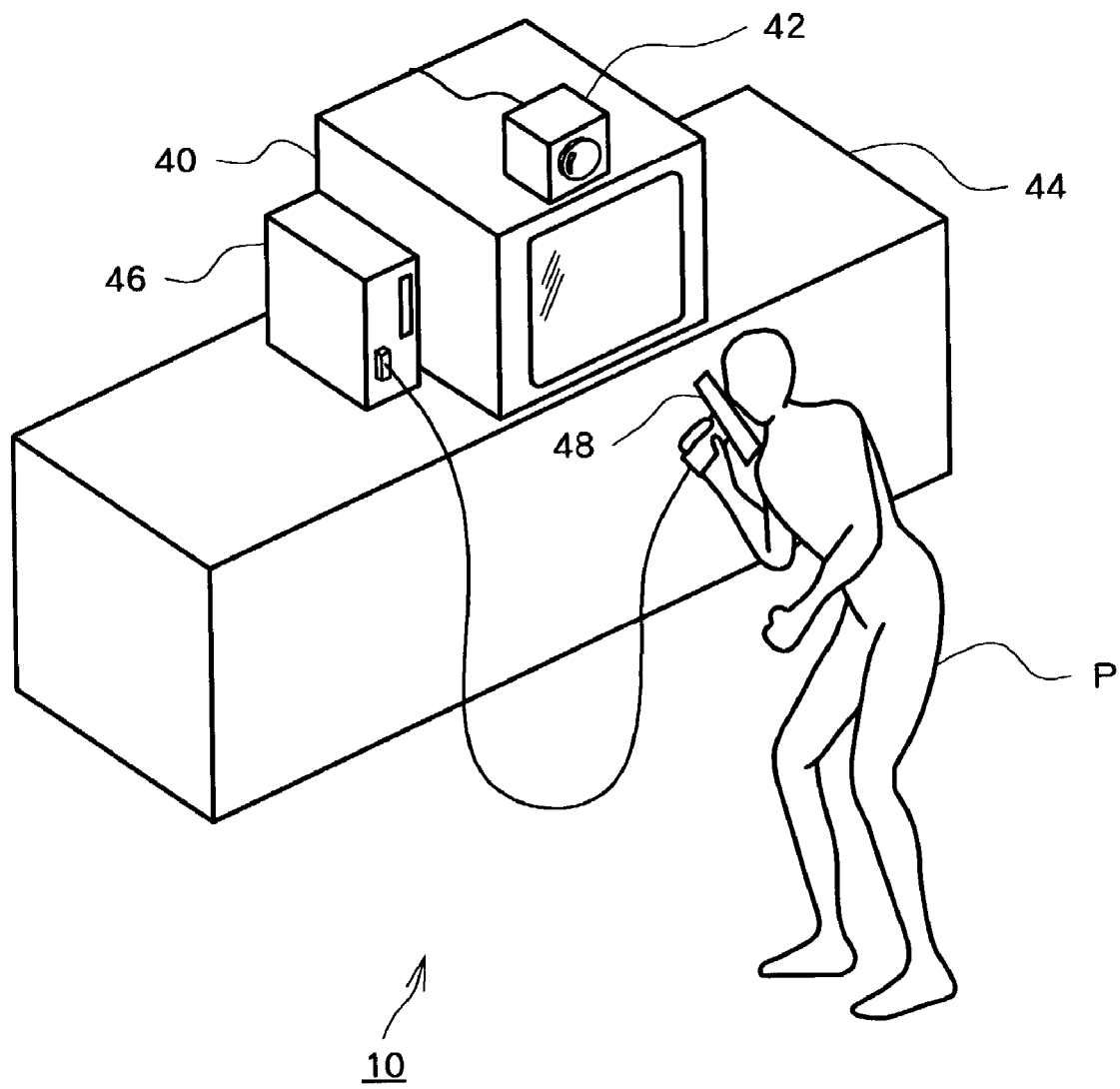
FIG. 1 illustrates a player enjoying a gun shooting game using a game device according to an embodiment of the present invention.

FIG. 1 is a perspective view for expressing a situation where a player plays a game using a game device according to one embodiment of the present invention. As illustrated in FIG. 1, the game device, which includes a home-use TV receiver 40, a camera unit 42, a home-use game machine 46, and a gun controller 48, is used for implementing a gun shooting game. The home-use TV receiver 40 and the home-use game machine 46 are mounted on a cabinet 44, while the camera unit 42 is on the home-use TV receiver 40. The camera unit 42 is a digital camera for presenting an image of a player P in real time, and connected to the home-use game machine 46 via a cable for supplying the captured player image to the game machine 46 in real time. The home-use game machine 46 is connected to the home-use TV receiver 40, so that game screen images produced by the game machine 46 are displayed while providing game music or game effect sound. The gun controller 48 is a game controller in the form of a gun, and connected to a controller connection terminal of the home-use game machine 46 via a cable. When the player P holds the gun controller 48 in his/her hand and aims it at the home-use TV receiver 40, the direction of its gun barrel is input to the home-use game machine 46. The gun controller 48 is provided with a trigger, whose condition (i.e. whether or not the trigger is pulled) is supplied to the home-use game machine 46.

In the home-use game machine 46, a three-dimensional game space (virtual three-dimensional space) is constructed in a memory, and how the three-dimensional game space is viewed from a viewpoint disposed at a predetermined spatial position is displayed on the TV receiver 40. At this time, in the home-use game machine 46, the position of the head of the player P is recognized from the player image, and the position of the viewpoint moves with the head position. As a result, when the player P moves his/her body in front of the camera unit 42, the game screen image displayed on the home-use TV receiver 40 is changed in accordance with the movement, so that the player P can feel as if he/she entered the three-dimensional game space. Thus, the home-use game machine 46 implements a game in which the player P shoots an enemy game character appearing in the three-dimensional game space with the gun controller 48, and avoids attacks (shooting) from the enemy game character by moving his/her body (specifically, the head position).

Figure 2:
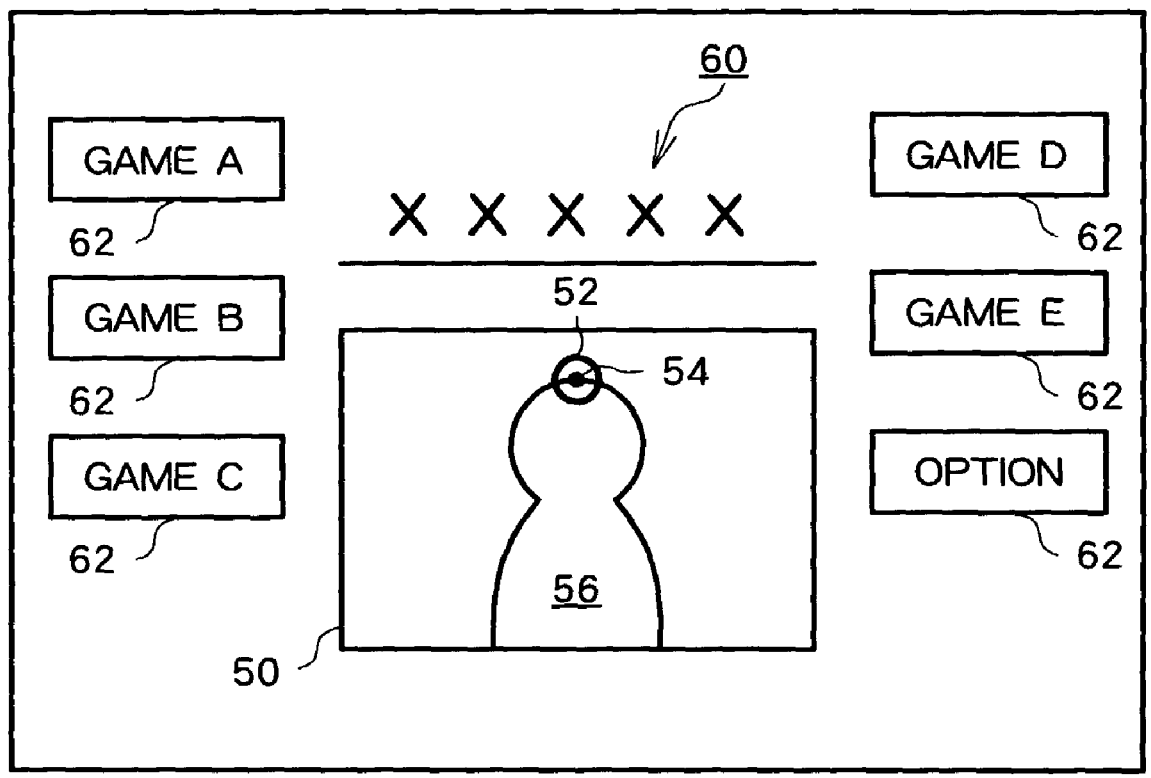
FIG. 2 illustrates an example of a title screen (start screen).

FIG. 2 illustrates an example of a title screen (start screen) of the game provided by the home-use game machine 46. The title screen in this figure is presented on the home-use TV receiver 40 after the home-use game machine 46 is activated or between games. As illustrated, on this title screen, menu button images 62 are displayed at either side of the screen, and a character string 60 indicating the title of the game is displayed at an upper central portion. Under the title character string 60, an image 50 for guiding the position where the player stands is displayed. The menu button images 62 are targets used for proceeding to a variety of games or option setting. When the player P shoots the menu button image 62 with the gun controller 48, the game or option setting corresponding to the shot menu button image 62 is initiated.

The player's standing position guidance image 50 is used for helping the player P to properly adjust the position where he/she stands before starting a game. The player P adjusts his/her standing position or posture in front of the camera unit 42, or adjusts the image capturing direction or position of the camera unit 42 before the game is started. The image 50 is obtained by displaying a head standard position marker 52 and a current recognized position marker 54 superposed on the base image, that is, the image captured by the camera unit 42 in real time, i.e. a player image 56. The head standard position marker 52 is a circular marker displayed at a fixed position of the player image 56 (such as the central position of the player image 56 located 15% from the top), and used for indicating the position (standard position) with which the image of (the uppermost part of) the player's head in the player image 56 should be aligned before the game is started. This game device 10 is designed such that the current position of the head of the player P can be recognized from the player image 56, and a dot indicating the recognized position is displayed superposed on the player image 56 as the current recognized position marker 54. The player P moves his/her body (the standing position or the posture) or changes the image capturing direction or position of the camera unit 42 so that the current recognized position marker 54 is placed within the circular head standard position marker 52, thereby properly adjusting the standard position (initial playing position). At this time, the game device 10 determines whether or not the current recognized position marker 54 is displayed within the head standard position marker 52, and changes the manner of displaying the head standard position marker 52 (such as color or blinking indication) in accordance with the determined result. Thus, the player P can easily carry out proper adjustment of the positional relationship between the player and the camera unit 42 while watching the player's standing position guidance image 50 before starting a game.

Figure 3A:
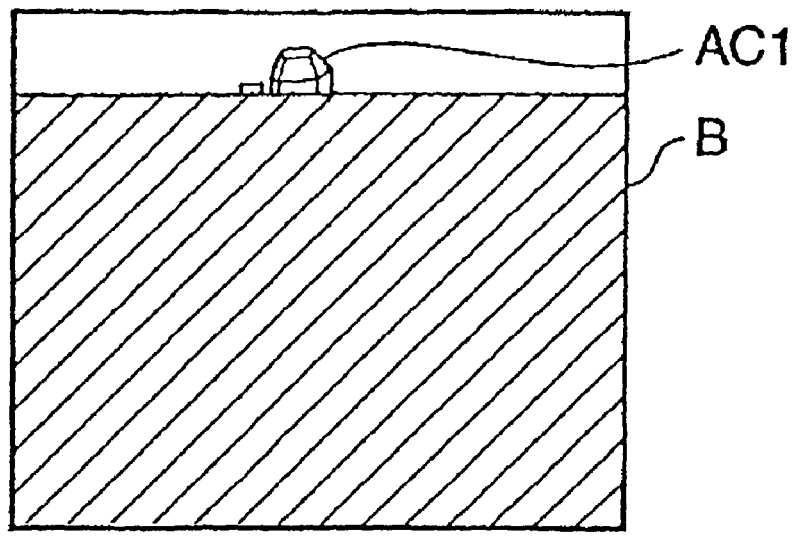
FIGS. 3A-3D are views for explaining an exemplary game screen presented when the player moves vertically.
Figure 3B:
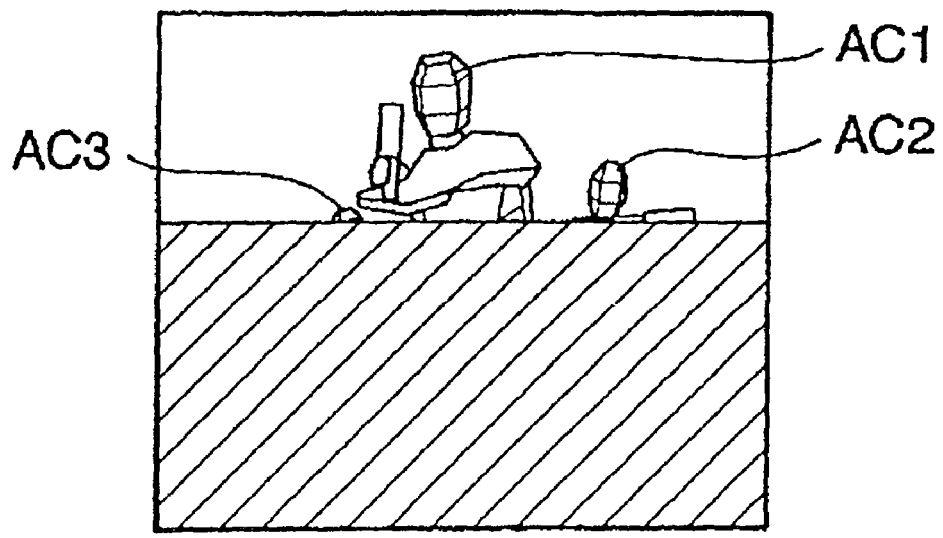
Figure 3C:
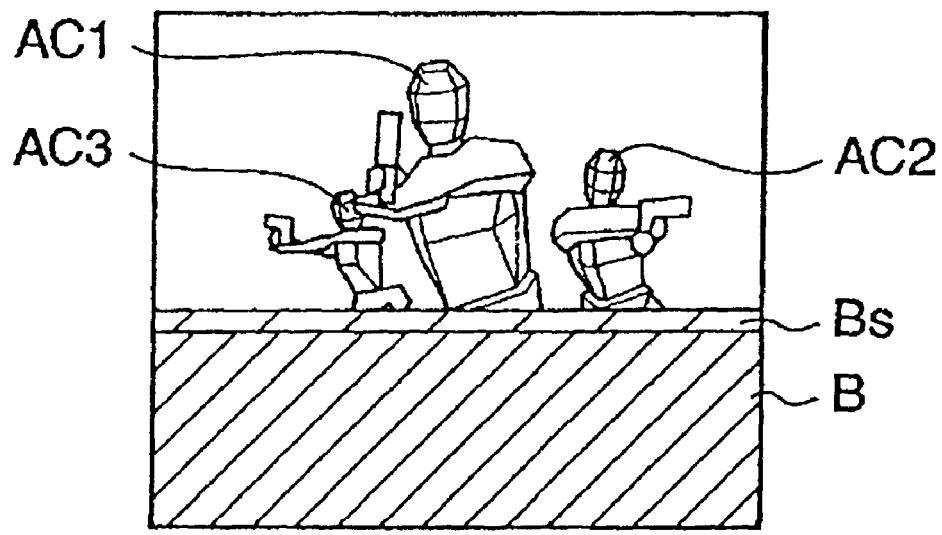
Figure 3D:
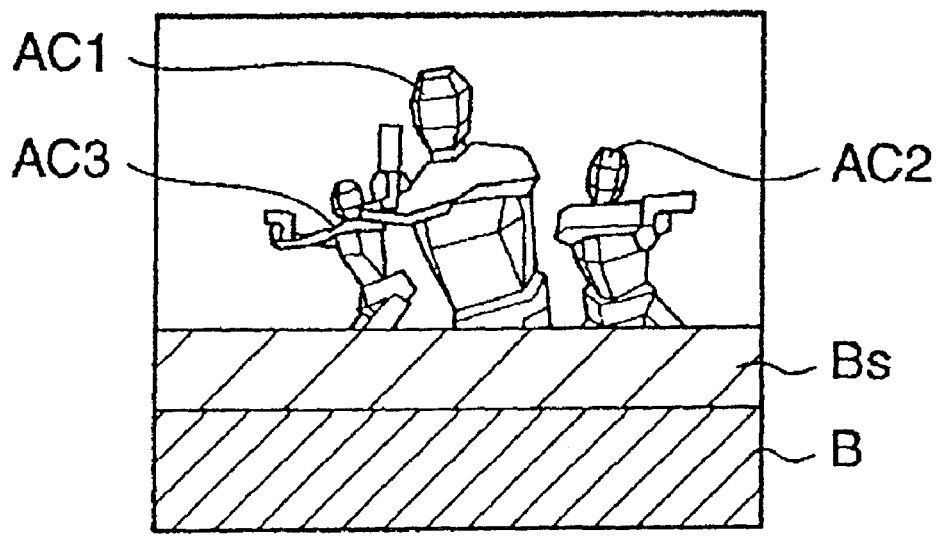

FIGS. 3A-3D illustrate an example of a series of game screens presented on the home-use TV receiver 40 when the head of the player P moves in the vertical direction. The figures show four screen images in the displayed order when the player P gradually rises from a half-sitting posture to a substantially erect posture in front of the camera unit 42, i.e. when the head of the player P is raised from a lower position to a higher position. The game screen in FIG. 3A includes a desk-shaped obstacle B immediately in front of the viewpoint, indicating that the player P is hiding in front of and below the obstacle B. In this situation, only part of the head of an enemy game character AC1 located beyond the obstacle B and holding a gun in his hand is displayed on the game screen. The game screen in FIG. 3B represents the situation where the player P raises his/her head a little so that the head is positioned substantially flush with the upper surface of the obstacle B. In such a situation, the enemy game character AC1 is displayed up to the chest thereof on the game screen, and the heads of two more enemy game characters AC2 and AC3 are additionally displayed behind the character AC1. The game screen illustrated in FIG. 3C indicates the situation where the player P further stretches his/her back to raise his/her head. In such a situation, the head of the player P is located slightly higher than the upper surface Bs of the obstacle, and upper bodies of the three enemy characters AC1-AC3 and the upper surface Bs of the obstacle are displayed. The game screen illustrated in FIG. 3D indicates the situation where the player P is in a substantially erect posture. In this situation, the player is exposed approximately up to the neck from the obstacle B, and the upper surface Bs of the obstacle is displayed more widely than that in the game screen of FIG. 3C. As illustrated in these figures, as the player's head is raised, the position where the obstacle B is displayed moves downward, and the upper surface Bs of the obstacle and the enemy game characters AC1-AC3 are gradually displayed on the game screen to reveal the whole images thereof.

Figure 4A:
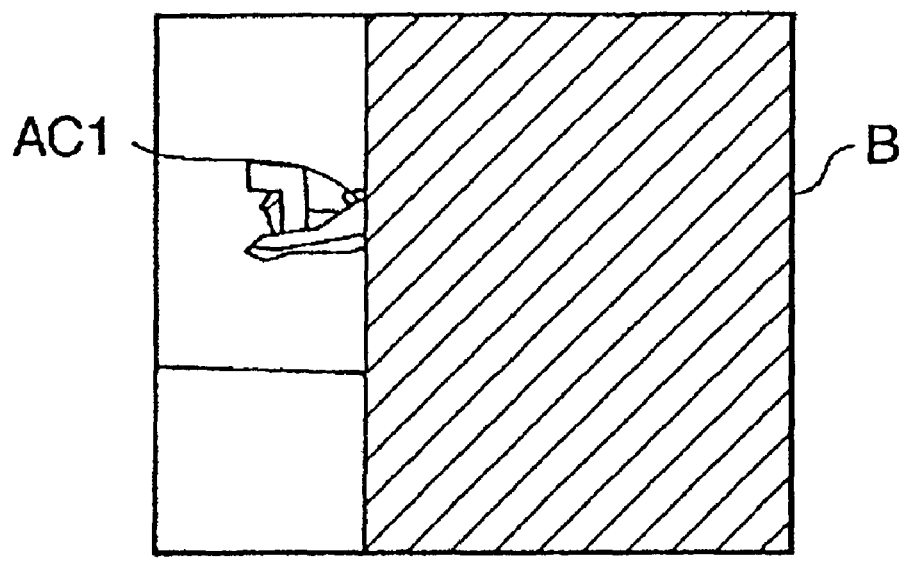
FIGS. 4A-4D are views for explaining an exemplary game screen presented when the player moves horizontally.
Figure 4B:
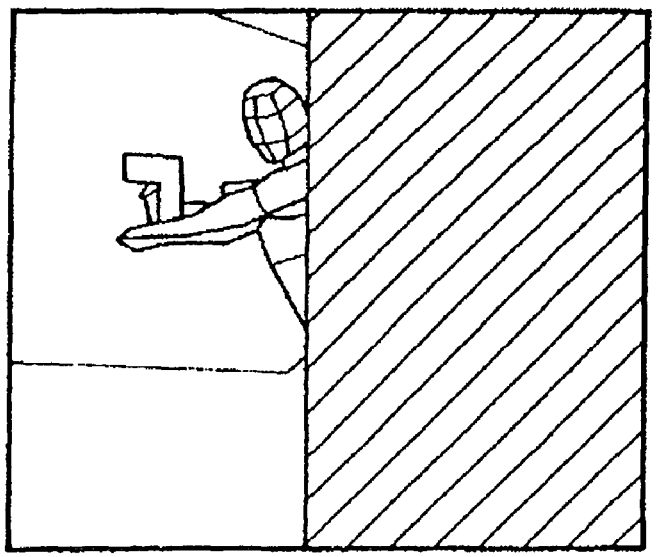
Figure 4C:
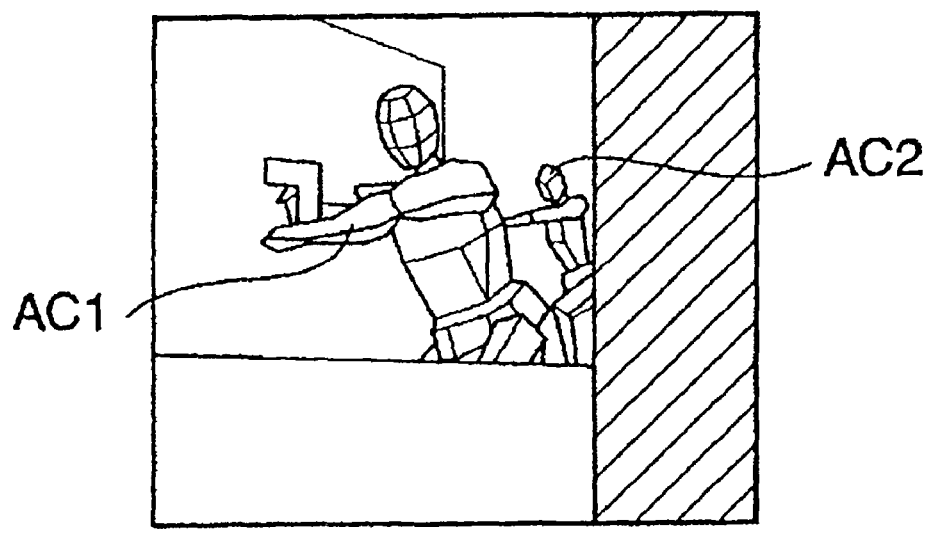
Figure 4D:
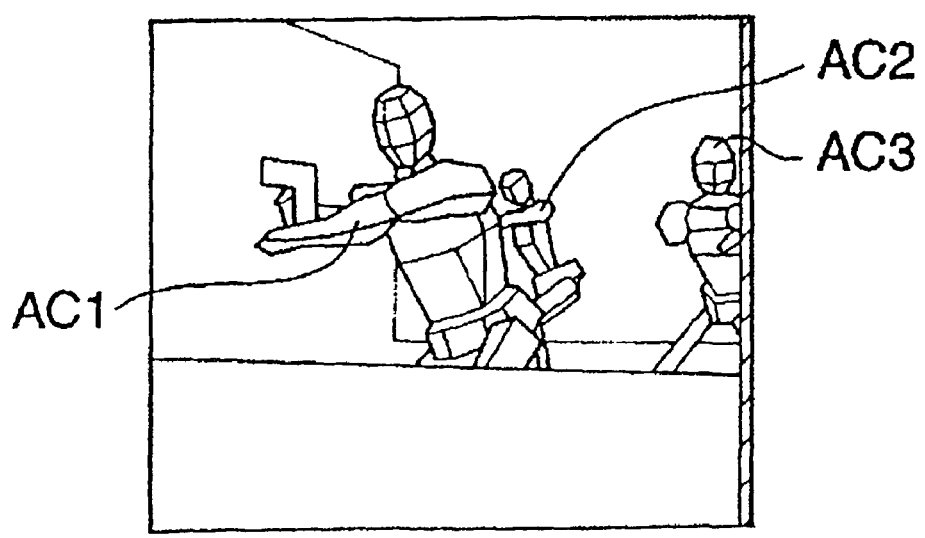

FIGS. 4A-4D illustrate an example of a series of game screens presented on the home-use TV receiver 40 when the head of the player P moves sideways. FIGS. 4A-4D show four screen images in the displayed order when the player P moves his/her body from right to left in front of the camera unit 42, i.e. the head of the player P moves from right to left. The game screen in FIG. 4A includes the obstacle B in the form of a door or a wall located on the right and immediately in front of the viewpoint, indicating the situation where the player P is hiding in front of the obstacle B. In such a situation, only part of an arm of the enemy game character AC1 located beyond the obstacle B and holding a gun in his hand is displayed on the game screen. The game screen in FIG. 4B represents the situation where the player P moves slightly to the left so that his/her head is substantially flush with the left edge of the obstacle B, showing up to the head and chest of the enemy game character AC1. The game screen in FIG. 4C represents the situation where the player P moves further to the left, showing substantially the upper half of the enemy game character AC1 and the enemy game character AC2 behind the character AC1. The game screen in FIG. 4D represents the situation where the player P comes out from the obstacle B to the left. In this situation, the enemy game character AC3 is also displayed in addition to the enemy game characters AC1 and AC2. As illustrated in these figures, as the player's head moves from left to right, the displayed position of the obstacle B moves rightward and the enemy game characters AC1-AC3 gradually appear on the game screen to reveal the whole images thereof.

FIG. 5 illustrates a hardware configuration of the game device 10. As illustrated, the game device 10 is formed by a DVD (digital versatile disk) 25, which is an information storage medium, placed in the home-use game machine 46 connected to the monitor 18 and the speaker 22. While the DVD 25 is used for supplying a game program and game data to the home-use game machine 46 in this embodiment, any other information storage media, such as CD-ROMs (compact disk-read only memory) and ROM (read only memory) cards, may be used instead. The game program and the game data can be remotely supplied to the home-use game machine 46 through a data network such as Internet.

The home-use game machine 46 includes a microprocessor 14, an image processing unit 16, a main memory 26, and an input/output processing unit 30, a peripheral equipment interface 31, a sound processing unit 20, and a DVD reproducing unit 24. The microprocessor 14, the image processing unit 16, the main memory 26, the input/output processing unit 30, and the peripheral equipment interface 31 are mutually connected via a bus 12 for data exchange, with the input/output processing unit 30 being further connected to the gun controller 48, the sound processing unit 20, and the DVD reproducing unit 24. The peripheral equipment interface 31 is connected to the camera unit 42. The respective elements of the home-use game machine 46 are all accommodated in a housing. In this embodiment, the home TV receiver 40 is used as the monitor 18, and a speaker incorporated therein is used as the speaker 22.

The microprocessor 14 controls the respective elements of the home-use game machine 46 based on an operating system stored in an unillustrated ROM and the game program read from the DVD 25. The bus 12 is used for exchanging addresses and data among the respective elements of the home-use game machine 46. The main memory 26 is used for storing the game program and game data read from the DVD 25 as required. The image processing unit 16, which includes a VRAM (video random access memory), receives image data from the microprocessor 14, and draws a game screen image in the VRAM. The image processing unit 16, moreover, converts the content of the VRAM into a video signal provided to the monitor 18.

The input/output processing unit 30 is an interface for relaying data communication between the microprocessor 14 and the gun controller 48, the sound processing unit 20, and the DVD reproducing unit 24. The gun controller 48 is a game controller in the form of a gun, as illustrated in FIG. 1, used for providing the home-use game machine 46 with a trigger state and the direction of the gun barrel or muzzle (specifically, the pointed position on the screen of the home-use TV receiver 40). The gun controller 48 can be of, for example, a well-known structure. More specifically, the gun controller 48 is designed so that, when the player P pulls a trigger of the gun controller 48, such information (trigger signal) is supplied from a controller terminal to the home-use game machine 46. When the home-use game machine 46 receives the trigger signal, an illuminating spot is scanned on the screen of the home-use TV receiver 40 by causing the game program to, for example, present a white screen for a single frame. The gun controller 48 is designed to include a light-receiving sensor with strong directivity at the back of the gun muzzle, so that, when the illuminating spot on the home-use TV receiver 40 is detected by the light-receiving sensor, the time period between the start of scan and the detection of the illuminating spot is calculated, thereby obtaining the position (coordinates) of the spot on the screen of the TV receiver 40 from the time period thus calculated. The position, i.e. the direction of the gun barrel, is supplied to the home-use game machine 46. Thus, the gun controller 48 can be suitably implemented. The time when scanning is started can be preferably obtained from a synchronous signal included in a video signal which is supplied from the home-use game machine 46 to the home-use TV receiver 40.

The sound processing unit 20 includes a sound buffer, and reproduces data, such as music and game effect sound read by the DVD 25 and stored in the sound buffer, and outputs the data from the speaker 22. The DVD reproducing unit 24 reads the game program and game data recorded in the DVD 25 in accordance with an instruction from the microprocessor 14. The peripheral equipment interface 31 is an interface for connecting a variety of peripheral devices to the home-use game machine 46, and can be formed by a USB (universal serial bus) interface or the like. In this embodiment, the camera unit 42 is connected to the peripheral equipment interface 31. The camera unit 42 is, for example, a well-known digital camera for supplying to the home-use game machine 46 a captured gray scale image (256 levels of gray) at predetermined time intervals (such as 1/60 seconds). In order to capture the image of the player P, the camera unit 42 is mounted on the home-use TV receiver 40 with its lens facing the player P in this embodiment.

The process performed by the home-use game machine 46 for displaying a title screen will now be described. This process is performed based on the game program stored in the DVD 25.

Figure 6:
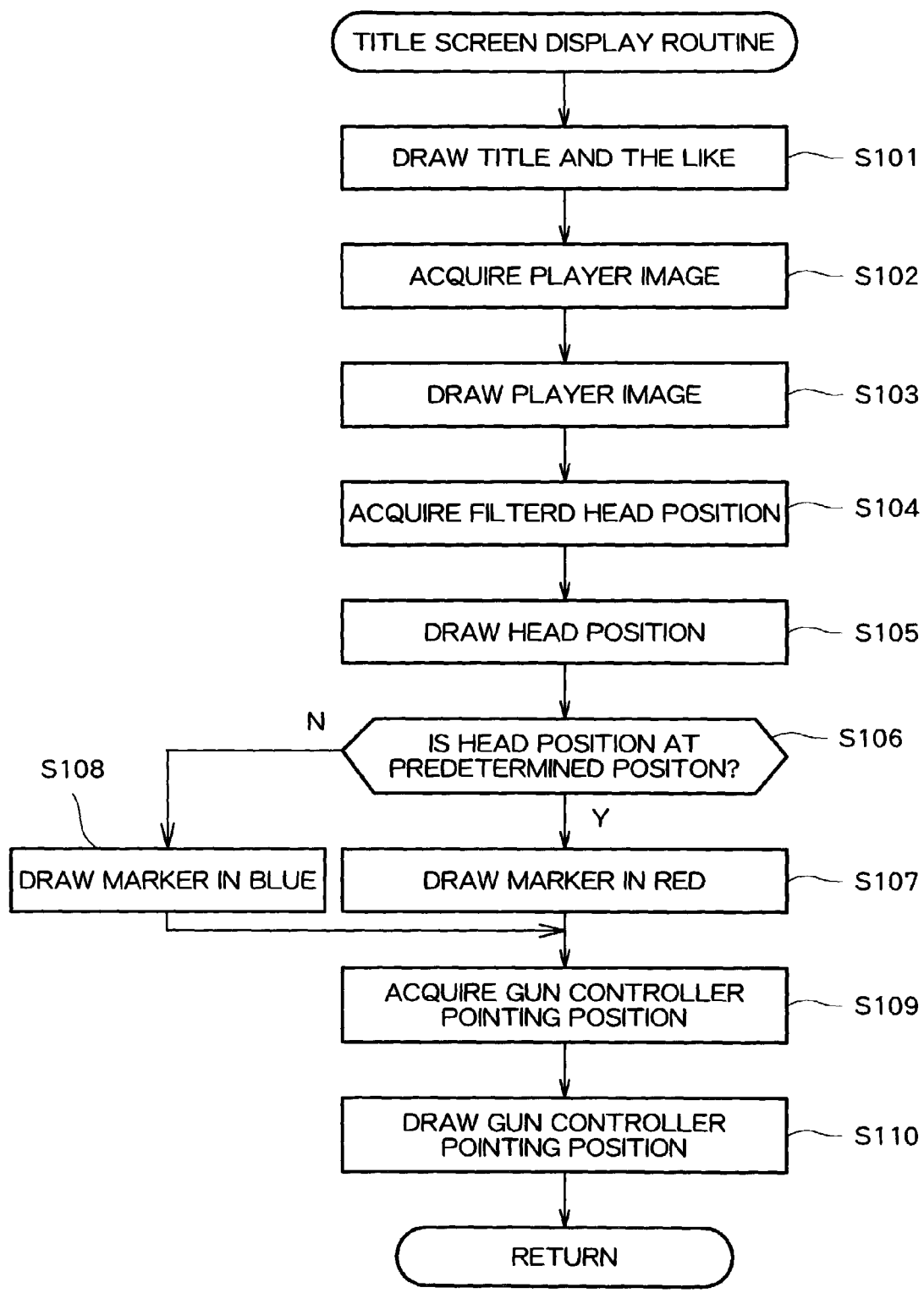
FIG. 6 is a flowchart for explaining a process for displaying the title screen.

FIG. 6 is a flowchart for describing a process of displaying a title screen by the home-use game machine 46. As illustrated, in the home-use game machine 46, the microprocessor 14 first draws a background image of the title screen, a character string of the title 60, the menu button image 62, a copyright message, and the like in a VRAM included in the image processing unit 16 (S101). An image captured by the camera unit 42 (hereinafter referred to as a "player image" because capturing the image of the player P is intended) is acquired (S102). The player image acquired at the step S102 is drawn in the VRAM so that the player image is placed where the player's standing position guidance image 50 is located in the title screen (S103).

The position of the head of the player P (head position) is recognized based on the player image acquired at the step S102, and information obtained by filtering the recognition result (filtered head position) is acquired (S104). The process of recognizing the position and filtering will be described later. The microprocessor 14 then draws the current recognized position marker 54 at the coordinates of the VRAM corresponding to the filtered head position so that the marker (red spot) is displayed at the head position of the player image included in the title screen (S105).

The microprocessor 14 then determines whether or not the filtered head position is located at the standard position (in the reference area). The standard position is the position in the player image where the head of the player P should be located before a game is started. If the filtered head position is located at the standard position, a red head standard position marker 52 is drawn at the standard position of the player image (S107). On the other hand, if the filtered head position is not at the standard position, a blue head standard position marker 52 is drawn at the standard position of the player image (S108). Next, the direction of the barrel of the gun controller 48 is acquired (S109), and at this position an aiming marker 58 is drawn (S110).

Figure 7:
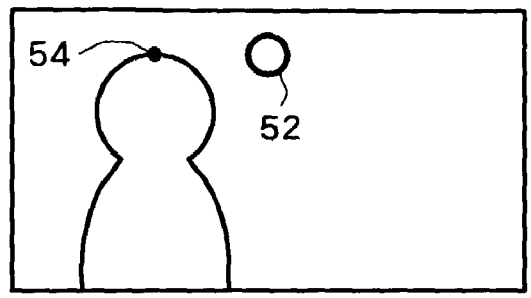
FIG. 7 illustrates an example of a player's standing position guidance image included in the title screen.

Thus, when the positional relationship between the player P and the camera unit 42 is inappropriate, the currently recognized 20. position marker 54 is displayed outside the circular head standard position marker 52, which is displayed in blue, on the title screen as illustrated in FIG. 7. On the other hand, when the positional relationship between the player P and the camera unit 42 is appropriate, the currently recognized position marker 54 is displayed inside the circular head standard position marker 52, which is displayed in red, on the title screen. As a result, the player P can change the standing position or the position where the camera unit 42 is installed or the image capturing direction to cause the head standard position marker 52 to be displayed in red on the title screen, thereby easily adjusting the positional relationship between the player P and the camera unit 42.

If the positional relationship between the player P and the camera unit 42 is not properly adjusted, the position of the head will not be placed within the player image when the player P bends down or sways during the game, causing possible misrecognition of the head position. However, according to the present game device 10, the positional relationship between the player P and the camera unit 42 can be properly adjusted before starting a game, so that the head position can be correctly recognized even when the player P bends down or sways during the game.

Figure 8:
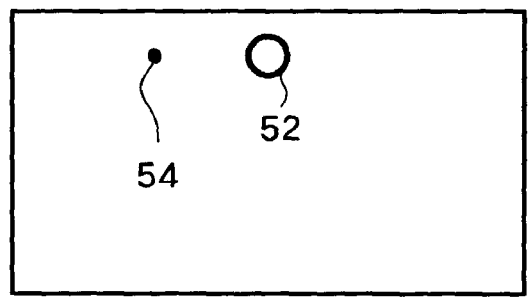
FIGS. 8 and 9 illustrate variations of a player's standing position guidance image included in the title screen.

The guidance provided to the player P is not limited to that described above. For example, as in the guidance image illustrated in FIG. 8, it is possible to display only the current recognized position marker 54 and the head standard position marker 52 without displaying the player image. Instead of changing the manner of displaying the head standard position marker 52 based on the positional relationship between the current recognized position marker 54 and the head standard position marker 52, the manner of displaying the current recognized position marker 54 (such as color or blinking pattern) may be changed. Alternatively, display may be presented at another position based on the positional relationship between the current recognized position marker 54 and the head standard position marker 52. Further, the current recognized position marker 54 may not be displayed.

Figure 9:
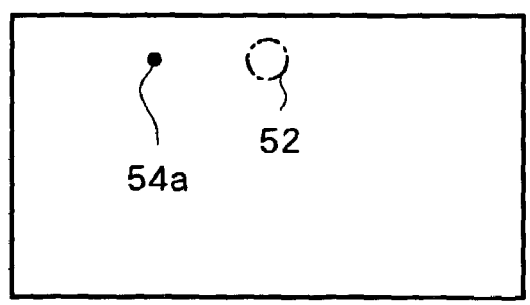

Further, as in the guidance image illustrated in FIG. 9, only the current recognized position marker 54 may be displayed, and the manner of displaying the marker 54 may be changed when the marker 54 is moved to the position where the head standard position marker 52 indicated by a dashed line in FIG. 9 should be displayed (the circle indicated by the dashed line in the figure is not actually displayed on the screen). In this manner as well, the player P can correct the positional relationship between the camera unit 42 and himself/herself while watching the guidance image.

Alternatively, messages, such as "Move to the right", "Move to the left", "Move forward", and "Move backward", may be displayed based on the relationship between the standard position and the currently recognized position of the head of the player P. Further, the shapes of the current recognized position marker 54 and the head standard position marker 52 are not limited to those described above, and a variety of shapes are possible. The guidance is preferably provided to the player P before the game is started, and therefore the guidance for the player P may be provided, for example, on a screen different from the title screen.

The process performed on the player image in the home-use game machine 46 will next be described.

Figure 10:
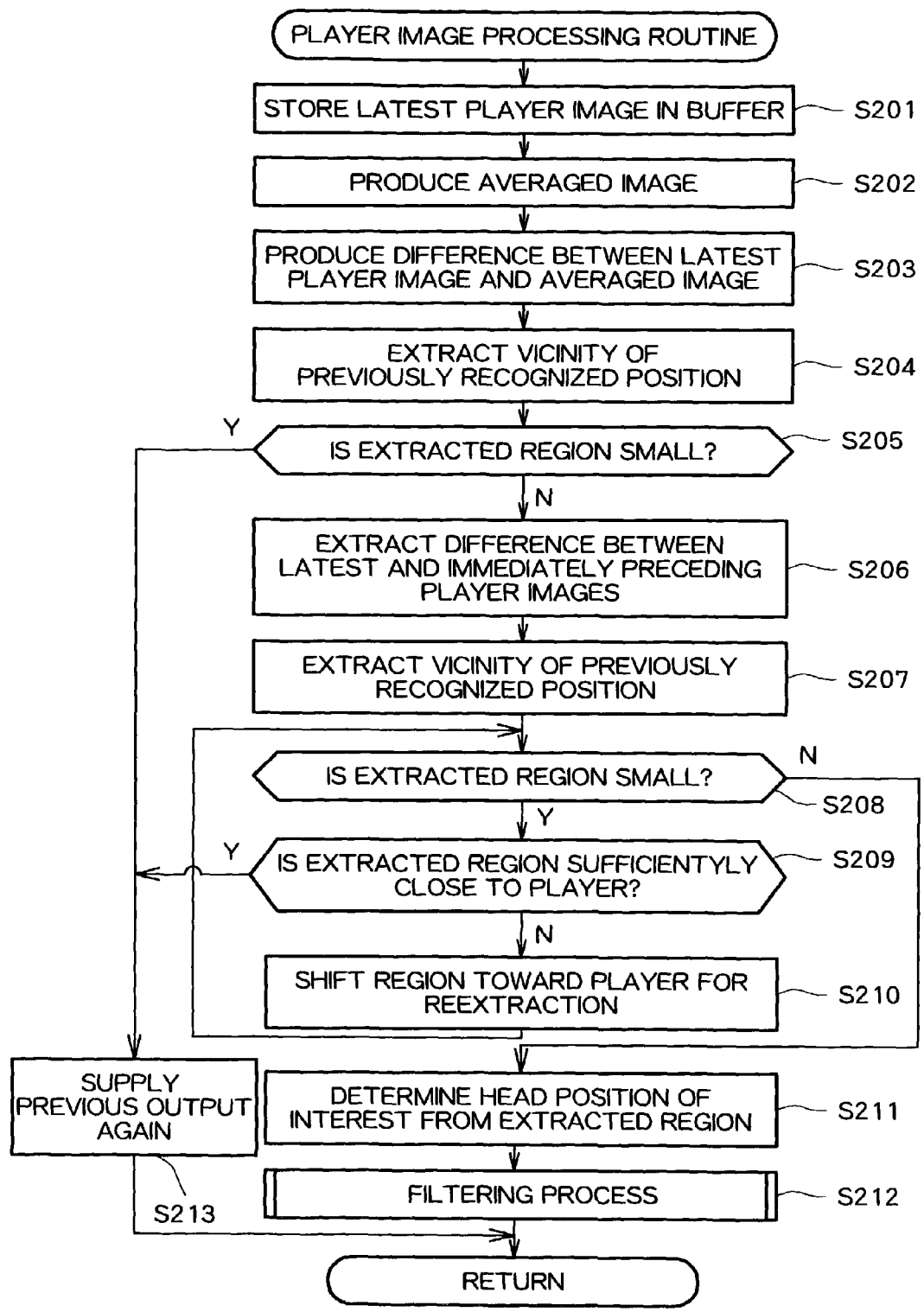
FIG. 10 is a flowchart for explaining a player image processing.
Figure 11:
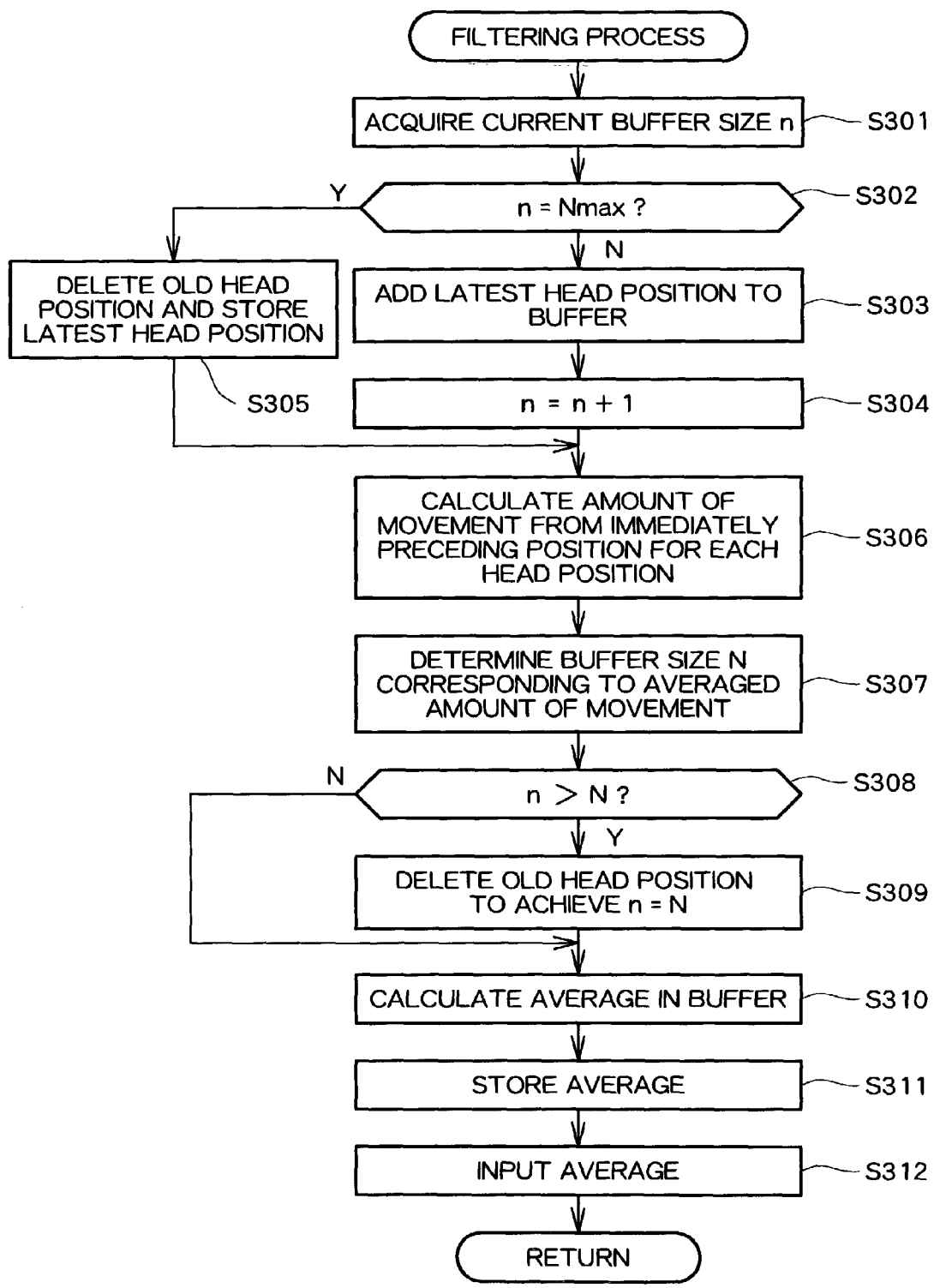
FIG. 11 is a flowchart for explaining a process of filtering a recognized position.

FIG. 10 is a flowchart for describing a process for recognizing the head position of the player P based on the player image captured by the camera unit 42 and filtering the recognized result. FIG. 11 is a flowchart for describing the filtering process in detail. These processes are performed in the home-use game machine 46 at predetermined time intervals (such as 1/60 of a second) based on the game program stored in the DVD 25.

Figure 12A:
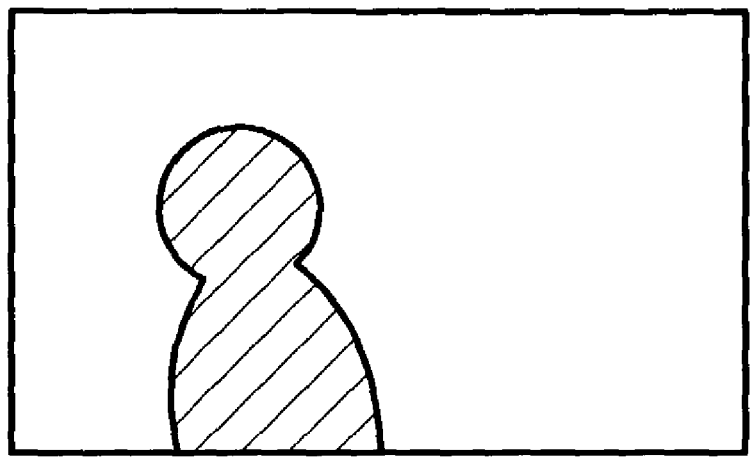
FIGS. 12A-12D illustrate a series of player images.
Figure 12B:
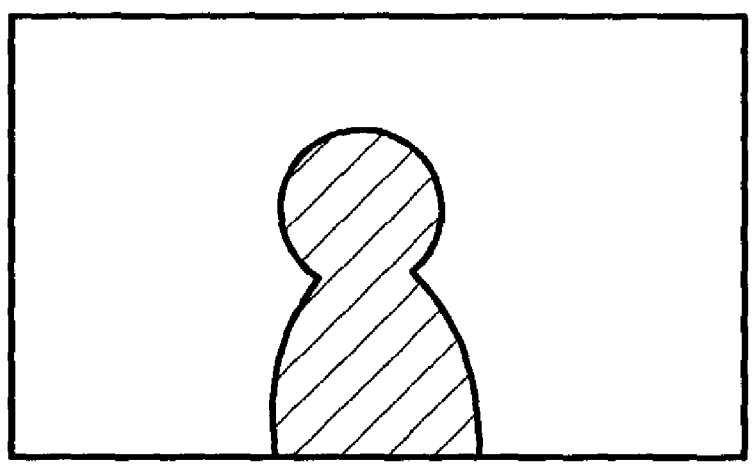
Figure 12C:
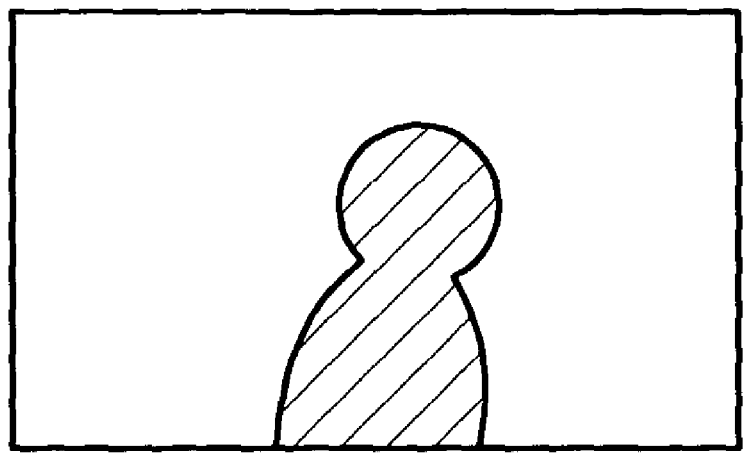
Figure 12D:
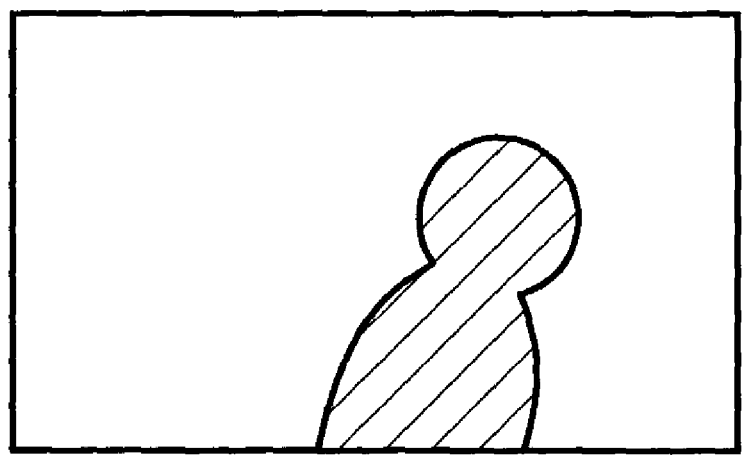

When the player image is captured by the camera unit 42, the microprocessor 14 first stores the player image in an image buffer provided in the main memory 26, as shown in FIG. 10 (S201). The image buffer is used for storing the player image captured by the camera unit 42 at predetermined time intervals, and stores a predetermined number (a total of four in this embodiment) of player images including the latest image in time sequence. When the latest player image is acquired, the newly acquired player image is additionally stored in the image buffer and the oldest player image is deleted. FIGS. 12A-12D show an example of a series of player images stored in the image buffer. FIG. 12A shows the latest player image, FIG. 12B shows the immediately preceding player image, FIG. 12C shows the player image immediately preceding the image in FIG. 12B, and FIG. 12D shows the player image immediately preceding the image in FIG. 12C, i.e. the oldest image in the image buffer. In this example of FIGS. 12A-12D, the player P swings from left to right in front of the camera unit 42.

Figure 13:
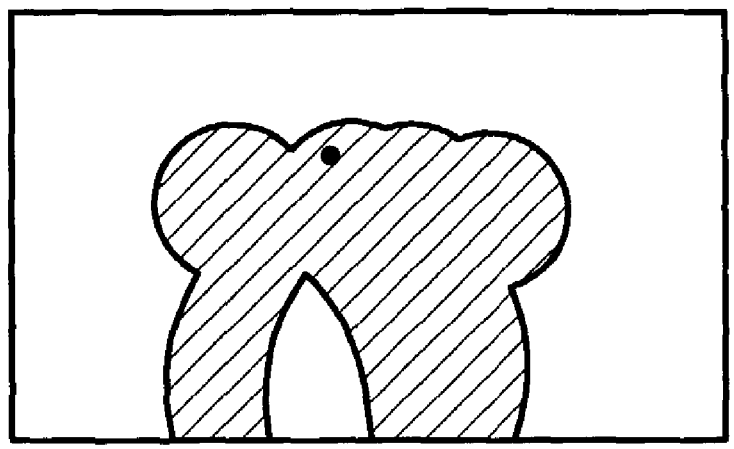
FIG. 13 is a view illustrating a difference image between an averaged player image and the latest player image.
Figure 14:
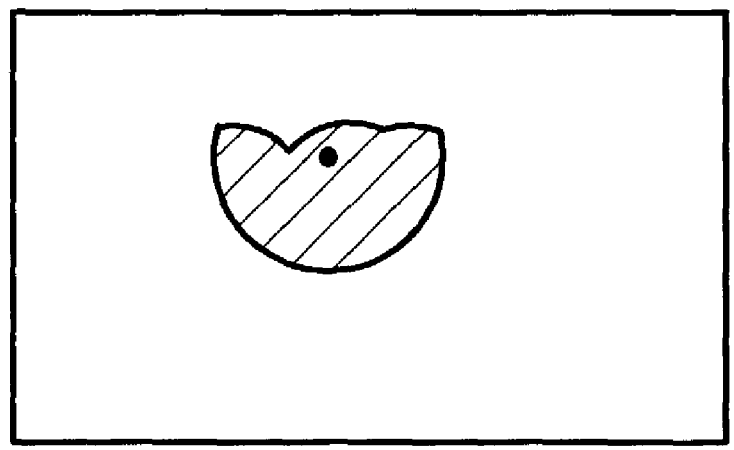
FIG. 14 is a view illustrating the result of extracting a region in the vicinity of the previously recognized position from the image illustrated in FIG. 13.

The microprocessor 14 then produces an averaged image of three player images stored in the image buffer excluding the latest image (S202). The averaged image is obtained by averaging the respective color information (256 levels of gray) assigned to the corresponding pixels of the three player images. The microprocessor 14 then produces a difference between the averaged image and the latest player image (S203). The difference image is produced by binarizing (monochroming) the image obtained by subtraction of color information assigned to the corresponding pixels of the two images. FIG. 13 shows an example of such a difference image. An image located within a circle centered at the previously recognized position (the head position of the player P) with a predetermined radius is extracted from the difference image (S204). FIG. 14 shows an example of the extracted image. In the figure, the black dot indicates the previously recognized position, which is not displayed in the extracted image in practice.

Figure 15:
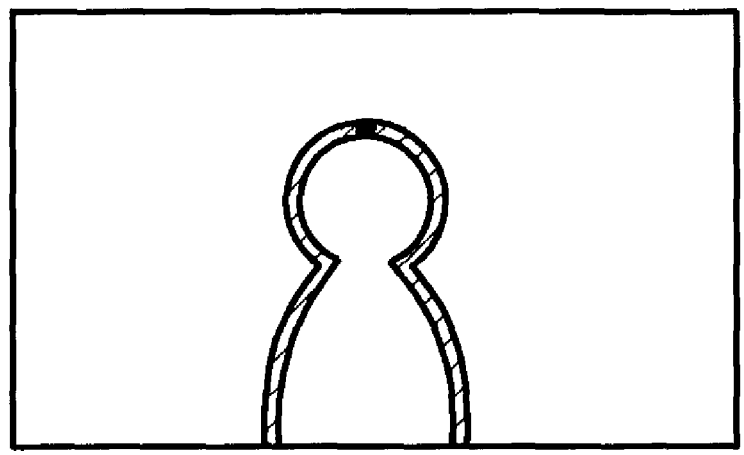
FIG. 15 is a view illustrating a difference image between the averaged player image and the latest player image when the player makes a small movement.
Figure 16:
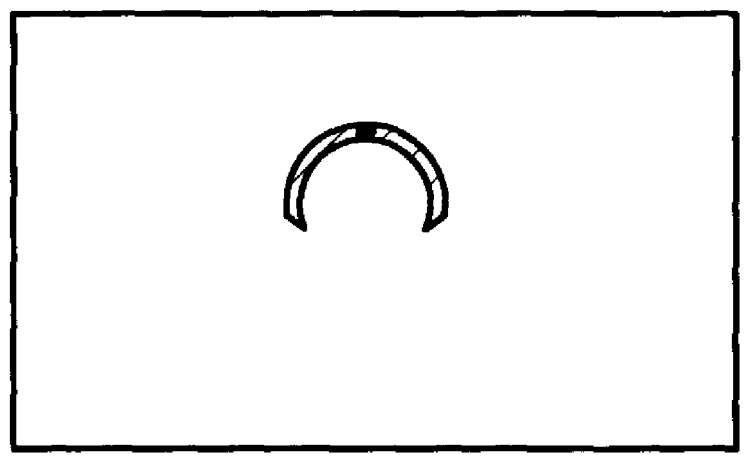
FIG. 16 is a view illustrating the result of extracting a region in the vicinity of the previously recognized position from the image illustrated in FIG. 15.

The microprocessor 14 then determines whether or not the area of the region displayed in black in the extracted image (the region where a difference remains) is smaller than a predetermined threshold (S205). If the area of the black region in the extracted image is smaller than the predetermined threshold, the previous output prestored in the main memory 26 (filtered head position) is output again (S213). When the player P does move very much, the difference remains only at the contour of the player P in the difference image obtained at the step S203 as illustrated in FIG. 15. In such a case, by extracting the vicinity of the previously recognized position the area is reduced as illustrated in FIG. 16. In the process from the step S202 to the step S205, the previous output is thus provided again when the player P makes only a small movement, so that fluctuation in output value is suppressed.

Figure 17:
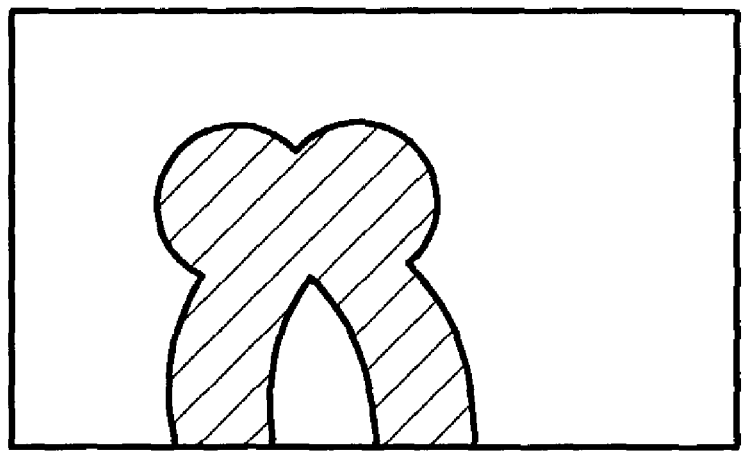
FIG. 17 is a view illustrating a difference image between the latest player image and the immediately preceding player image.
Figure 18:
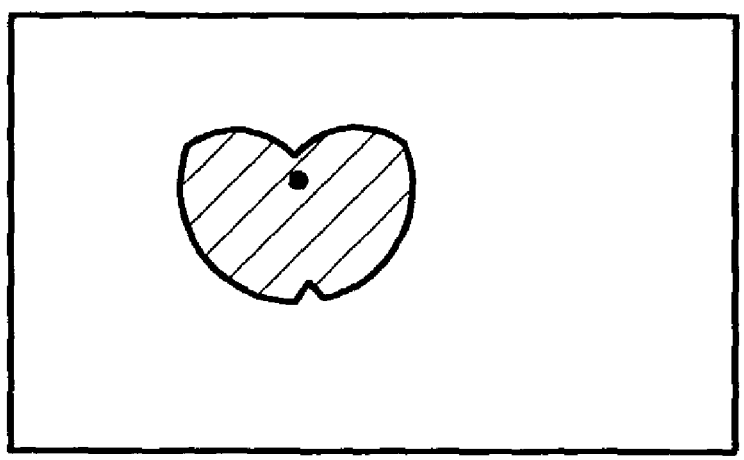
FIG. 18 is a view illustrating the result of extracting a region in the vicinity of the previously recognized position from the image illustrated in FIG. 17.

On the other hand, if the area of the black region in the extracted image is equal to or exceeds the predetermined threshold, the latest player image (FIG. 12A) and the immediately preceding player image (FIG. 12B) are read from the image buffer to produce the difference image (binarized image) (S206). FIG. 17 shows an example of such a difference image. The microprocessor 14 then extracts an image within a circle centered at the previously recognized position with a predetermined radius (selection range) from the difference image. FIG. 18 shows an example of the extracted image. In FIG. 18, the black dot indicates the previously recognized position, and is not displayed in the extracted image in practice. The position of the pixel displayed in black in the extracted image is used for recognizing the head position of the player P at the step S211. In other words, the extracted image includes a base position group for recognizing the head position of the player P.

Figure 19:
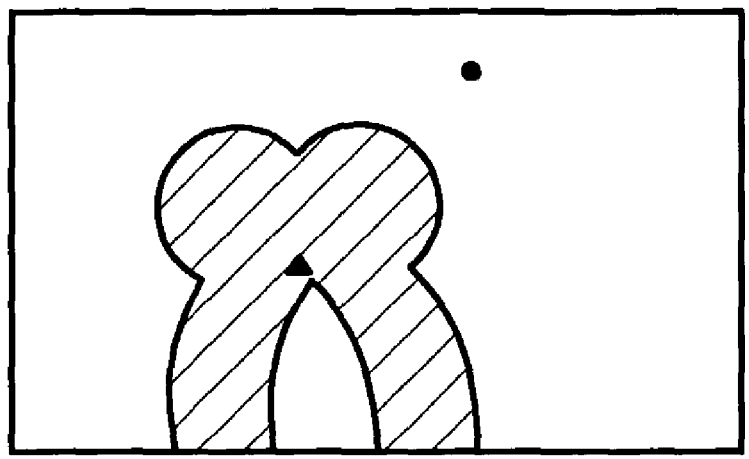
FIG. 19 is a view illustrating a difference image between the latest player image and the immediately preceding player image when the previously recognized position is distant from the latest player image and the immediately preceding player image.
Figure 20:
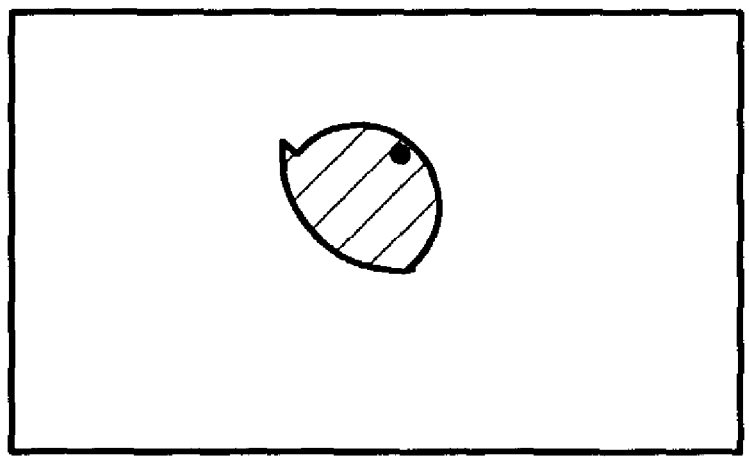
FIG. 20 is a view illustrating the result of extracting, from the image illustrated in FIG. 19, the area moved closer to the player from the previously recognized position.

The microprocessor 14 measures the height and width of the black region in the extracted image (the base position group, i.e. the region where a difference remains), and determines whether or not the values are smaller than the respective predetermined thresholds (S208). If either value is smaller than the predetermined threshold, the extracted range (selection range) is shifted toward the player P and reproduces the extracted image (S210) until the extracted range (selection range) is sufficiently close to the player P (S209). More specifically, the barycenter of the region shown in black in the difference image (binarized image) obtained at the step S206 is calculated, and the center of the extracted range (selection range) is moved closer to the barycenter from the previously recognized position by a predetermined distance at a time. FIG. 19 is a view for explaining such a process. The region with hatching indicates a region where the difference remains, a black triangle indicates the barycenter of the difference, and a black dot indicates the previously recognized position. This figure shows that the player P has rapidly moved in front of the camera unit 42 from the upper left to the lower right. In such a situation, the center of the extracted range (selection range) is gradually moved from the black dot position toward the black triangle in the figure at the step S210. If the black region in the extracted image is still small even after movement is made by a predetermined ratio, such as 70%, of the distance between the previously recognized position and the barycenter, the previous output is supplied again (S213). On the other hand, if both the height and width of the black region in the extracted image are equal to or exceed the predetermined threshold as illustrated in FIG. 20 after shifting the extracted range (selection range), the head position of interest is determined from that particular extracted image (S211). For example, the position located at the center of the black region and several pixels from the top in the extracted image is selected as the head position of interest. The current head position thus selected (recognized) is filtered to supply a filtered head position (S212).

Thus, the base position group is selected within the selection range corresponding to the previously recognized position in principle, and reselected by changing the selection range exceptionally, thereby eliminating effects of moving objects, if any, other than the player appearing in the player image and achieving proper recognition of the position even when the head position rapidly moves.

Figure 21A:
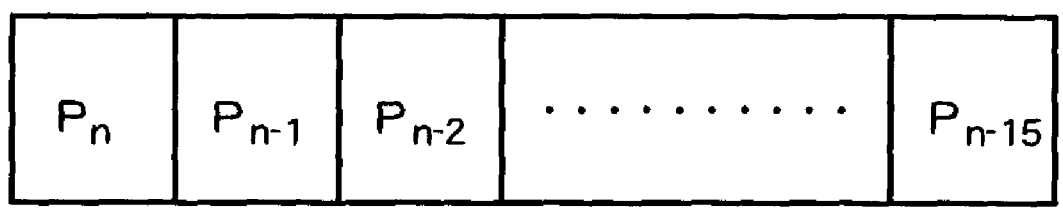
FIGS. 21A and 21B illustrate the content stored in the recognized position buffer.
Figure 21B:
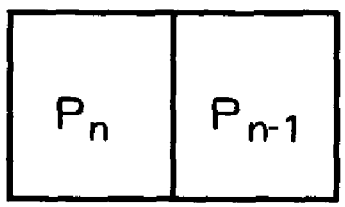

In the above-described filtering process, a head position buffer is provided in the main memory 26 for storing a maximum of 16 head positions ($P_n$ to $P_{n-15}$ wherein the index corresponds to the time of recognition) as illustrated in FIG. 21A. The head position buffer is used for storing the head position of the player P recognized at predetermined intervals. In this buffer, a maximum of 16 head positions are stored in time sequence including the latest head position. When the latest head position is recognized, this head position is additionally stored in the head position buffer, and the oldest head position is deleted. When, for example, the head position $P_{n+1}$ is recognized while the buffer is in the state illustrated in FIG. 21A, the head position $P_{n+1}$ is additionally stored and the oldest head position $P_{n-15}$ is deleted from the head position buffer. The buffer size of this head position buffer, i.e. the number of head positions stored therein, is variable, and therefore assumes one of four states in which the number of stored head positions is two as in FIG. 21B, four, eight, or sixteen as in FIG. 21A.

As illustrated in FIG. 11, the filtering process begins with acquisition of the current buffer size n of the head position buffer (S301). If the current buffer size n is equal to the maximum size Nmax (16 in this example) (S302), the oldest head position is deleted from the head position buffer, and the latest head position is stored in the head position buffer (S305). On the other hand, if the current buffer size n is not equal to the maximum size Nmax, the latest head position is additionally stored in the head position buffer without deleting the oldest head position (S303), and adds one to the current buffer size n (S304).

The amount of movement for each head position stored in the head position buffer is next calculated (S306). More specifically, the distance between each head position and the immediately previous head position is obtained. For instance, in the example of FIG. 21, the distances between the head positions $P_n$ and $P_{n-1}$, between the head positions $P_{n-1}$ and $P_{n-2}$, between the head positions $P_{n-2}$ and $P_{n-3}$, . . . , and between the head positions $P_{n-14}$ and $P_{n-15}$ are calculated. An average of the thus calculated movement amounts is obtained to determine the buffer size N corresponding to the average (S307). By way of example, the buffer size N is defined here as 2 when the average is not smaller than 11, 4 when the average is 9 or greater but smaller than 11, 8 when the average is 7 or greater but smaller than 9, and 16 when the average is smaller than 7. While the buffer size N is determined based on the averaged movement amount of the respective head positions stored in the head position buffer in this embodiment, other calculation methods may be used instead. For example, the movement amounts of the respective head positions may be weighted, or only the relatively new head positions among those stored in the head position buffer may be subjected to calculation of movement amount, so that the buffer size N can be rapidly reduced when the latest head position is determined as being rapidly moved.

Next, the current buffer size n and the buffer size N are compared (S308). If the current buffer size n exceeds the buffer size N, the head positions stored in the head position buffer are deleted starting from the oldest one in time sequence until the current buffer size n is equal to the buffer size N (S309). On the other hand, if the current buffer size n is equal to or smaller than the buffer size N, the step S309 is skipped. The average of the head positions stored in the head position buffer is obtained and stored in the main memory 26 as the previous output (S311), and output as the filtered head position (S312). The filtered head position thus output is used for determining the viewpoint position when a three-dimensional game space is drawn, as described above. The filtered head position is also used for determining the display position of the currently recognized position marker 54 when the player's standing position guidance image 50 is displayed on the title screen. Note that although the average of the head positions stored in the head position buffer is used as the filtered head position in the above description, the head positions stored in the head position buffer may be weighted, so that, for example, the latest head position gives a greater effect on the filtered head position.

According to the above-described filtering process, the average of the head positions stored in the head position buffer is output, thereby reducing fluctuation in the value of the filtered head position. Further, as the size of the head position buffer, i.e. the number of stored positions is varied in accordance with the movement amounts of the respective head positions stored in the head position buffer, the value of the filtered head position can be rapidly changed to cope with a rapid movement of the head position of the player P. As a result, the game process using the filtered head position can be properly performed.

The present invention is not limited to the above-described embodiment.

For example, while the present invention is applied to a gun shooting game in the above description, it is applicable to any kind of games that proceed based on an image captured by the image capturing means.

Although the head of the player P is the object for position recognition in the above description, any other parts can be such objects. Further, the object can be a variety of articles the player holds in his/her hands, such as a toy golf club, a toy tennis racket, a toy weapon, and the like.

What is claimed is:

1. A game device operative to create a display for a game from a variable perspective of a player based on player movement, comprising:
   image capturing means for capturing player images at predetermined time intervals;
   selecting means for selecting a base position group, defining a difference between a current player image and at least one previous player image within a predetermined selection range, used for recognizing a predetermined part of a player from the predetermined selection range corresponding to a previously recognized position of the predetermined part, based on the player images captured by said image capturing means;
   reselecting means for changing said selection range in accordance with the selected base position group to reselect the base position group used for recognizing the predetermined part of the player; and
   recognized position determining means for determining a present recognized position based on the base position group selected by said selecting means or reselected by said reselecting means.

2. A game device according to claim 1, wherein
   said selecting means selects the base position group used for recognizing the predetermined part of the player from the predetermined range surrounding the previously recognized position, and
   said reselecting means shifts said selection range based on said player image.

3. A game device, operative to create a display for a game from a variable perspective of a player based on player movement, comprising:
   image capturing means for capturing player images at predetermined time intervals;
   recognizing means for recognizing a position of a predetermined part of a player based on the player images captured by said image capturing means, and outputting the recognized position;
   recognized position storing means for storing a predetermined number of recognized positions formerly output by said recognizing means;
   movement amount calculating means for calculating an amount of movement for each recognized position stored by said recognized position storing means;
   number changing means for changing said number based on the amount of movement for each recognized position calculated by said movement amount calculating means;
   output value calculating means for calculating an output value based on said number of recognized positions stored by said recognized position storing means; and game processing means for performing a game process based on the output value supplied by said output value calculating means.

4. A method of processing an image of a person for a game, operative to create a display for the game from a variable perspective of a player based on player movement, comprising steps of:
- capturing images of a person at predetermined time intervals;
- selecting a base position group, defining a difference between a current player image and at least one previous player image within a predetermined selection range, used for recognizing a predetermined part of the person from a predetermined selection range corresponding to a previously recognized position of the predetermined part, based on the captured images of the person;
- changing said selection range based on the selected base position group to reselect the base position group used for recognizing a predetermined part of the person; and
- determining a present recognized position based on the selected or reselected base position group.

5. A computer program product storing a program for causing a computer to execute a game that is operative to create a display for the game from a variable perspective of a player based on player movement, comprising the, steps of:
- capturing images of a person at predetermined time intervals;
- selecting a base position group, defining a difference between a current player image and at least one previous player image within a predetermined selection range, used for recognizing a predetermined part of the person from a predetermined selection range corresponding to a previously recognized position of the predetermined part, based on the captured images of the person;
- changing said selection range based on the selected base position group to reselect the base position group used for recognizing a predetermined part of the person; and
- determining a present recognized position based on the selected or reselected base position group.

6. A method for processing images of a person for a game, operative to create a display for the game from a variable perspective of a player based on player movement, comprising steps of:
- capturing the images of the person at predetermined time intervals;
- recognizing a position of a predetermined part of the person based on the captured images of the person, and outputting the recognized position;
- sequentially storing the recognized position in storing means;
- calculating an amount of movement for each recognized position stored in said storing means;
- changing the number of recognized positions stored in said storing means based on the calculated amount of movement for each recognized position; and
- calculating an output value based on the recognized position stored in said storing means.

7. A computer program product storing a program for causing a computer to execute a game that is operative to create a display for the game from a variable perspective of a player based on player movement, comprising the steps of:
- capturing images of a person at predetermined time intervals;
- recognizing a position of a predetermined part of the person based on the captured images of the person, and outputting the recognized position;
- sequentially storing the recognized position in storing means;
- calculating an amount of movement for each recognized position stored in said storing means;
- changing the number of recognized positions stored in said storing means based on the calculated amount of movement for each recognized position; and
- calculating an output value based on the recognized position stored in said storing means.

* * * * *